United States Patent

Nikaido

[11] Patent Number: 5,333,454
[45] Date of Patent: Aug. 2, 1994

[54] FLOW CONTROL VALVE UNIT

[75] Inventor: Masaya Nikaido, Saitama, Japan

[73] Assignee: Jidosha Kiki Co., Ltd., Tokyo, Japan

[21] Appl. No.: 17,809

[22] Filed: Feb. 16, 1993

[30] Foreign Application Priority Data

Mar. 6, 1992 [JP] Japan .................. 4-082983

[51] Int. Cl.$^5$ .............................. F16D 31/02
[52] U.S. Cl. ........................... 60/459; 91/426; 91/444; 137/596.12; 137/117
[58] Field of Search ............. 60/459, 452, 466, 460, 60/384, 385; 91/420, 421, 426, 433, 444; 137/117, 116.3, 596.12, 505.13

[56] References Cited

U.S. PATENT DOCUMENTS

| | | |
|---|---|---|
| 4,343,324 | 8/1982 | Ohe et al. ............... 137/117 |
| 4,361,166 | 11/1982 | Honaga et al. ........... 137/117 |
| 4,396,033 | 8/1983 | Narumi et al. ........... 137/117 |
| 4,469,011 | 9/1984 | Loffler .................. 91/433 |
| 4,549,566 | 10/1985 | Fujiwara et al. ......... 137/117 |
| 4,700,733 | 10/1987 | Uchino .................. 137/117 |
| 4,753,264 | 6/1988 | Uchino et al. ........... 137/117 |

FOREIGN PATENT DOCUMENTS 63-37749 7/1988 Japan .
1-132471 5/1989 Japan .

*Primary Examiner*—Edward K. Look
*Assistant Examiner*—Hoang Nguyen
*Attorney, Agent, or Firm*—Flynn, Thiel, Boutell & Tanis

[57] ABSTRACT

A connector 5 having an outlet 4 for delivering a pressure oil to a power steering apparatus PS is secured in an opening of a valve receiving bore 2 in which a flow controlling spool valve 3 is received. The connector 5 includes an axial bore 5a which continues from the outlet 4 and in which a valve sleeve 10 is slidably fitted. The valve sleeve 10 has pressure oil passages 11, 12 therein in which orifices 13, 14, 15 are formed, and pressure differentials thereacross are utilized to operate the spool valve 3 in order to return an excess amount of flow. At its outer end, the valve sleeve 10 is formed with a flange 10b, and a restriction 20 is defined between the outer peripheral surface of the flange 10b and the internal peripheral surface of the valve receiving bore 2 for restricting the flow rate of the pressure oil. A pressure differential developed across the restriction 20 is effective to move the valve sleeve 10 to control the orifices 14, 15 so that the latter may be reduced.

4 Claims, 6 Drawing Sheets

FLOW CONTROL VALVE UNIT

FIELD OF THE INVENTION

The invention relates to a flow control valve unit which is capable of controlling a flow response of a pressure oil from a hydraulic pump, which may be utilized in a hydraulic instrument such as a hydraulic power steering apparatus and which is driven by an engine as a drive source so as to be responsive to the number of revolutions thereof, and in particular, to a flow control valve unit exhibiting a drooping response in which the flow rate supplied to a hydraulic instrument is reduced in response to an increase in the discharge flow from a pump as the number of revolutions of the pump increases, and more specifically, to such a flow control valve unit of non-return drooping response type in which the flow rate being supplied cannot be returned to its original value as influenced by a pressure rise in the hydraulic instrument.

BACKGROUND OF THE INVENTION

In a power steering apparatus which is mounted on an automobile to alleviate the force required by a driver to steer the automobile, a pump which acts as a source of pressurized oil pressure is normally driven for rotation by an engine which is mounted on the automobile. The discharge of the working oil from the pump increases or decreases in proportion to a change in the number of revolutions of the engine. Accordingly, in a pump of a type which is responsive to the number of revolutions, it is required that the pump have a capacity to be able to supply a sufficient flow to a hydraulic instrument such as a power steering apparatus even when the engine operates in a range of a low number of revolutions or when the pump discharge is low. However, the choice of such capacity for the pump is insufficient by itself in that when the engine operates with a higher number of revolutions, an unnecessarily increased flow will be supplied to the power steering apparatus. In such instance, it is necessary to return an excess amount of flow to a tank.

To accommodate for this, it has been a conventional practice to provide an orifice in an oil pressure supply passage which extends from the pump to the power steering apparatus so that a pressure differential across the orifice operates to open a spool valve, acting as a flow control valve, so that part of the flow or pressurized oil which is in excess of that required to operate the power steering apparatus smoothly returned to the tank without causing a flow resistance, thereby allowing the flow rate being supplied to the power steering apparatus to be maintained at a constant amount or less.

However, in a pressurized oil supply system as may be used for the power steering apparatus described above, the amount of pressurized oil being supplied when the engine of the automobile operates in a range of a high number of revolutions presents a problem in respect of the running stability of the automobile. Specifically, when running the automobile at a high speed, the driver is subject to a level of anxiety if the steering wheel can be maneuvered too lightly. To eliminate such difficulty, a drooping response, namely, a reduction of the amount of pressurized oil being supplied to a certain degree as the number of revolutions increases is useful to achieve a vehicle stability or an adequate sensation of steering when running at a high speed and for the purpose of achieving a saving of power.

To this end, the orifice which has been used in the prior art for purpose of controlling the flow rate is constructed as a variable throttle structure so that it may function as a fixed throttle when the automobile is parked or is running at low or medium speeds, while when the automobile is running at a higher speed, the orifice is throttled down, so that the resulting pressure differential thereacross may be utilized to increase the amount of flow returned to the tank, thus reducing the supply of pressurized oil to the power steering apparatus.

However, when such a flow control including the drooping response is attempted through a simple variable control of the orifice, there occurs a pressure rise in the pressurized oil supply system when the power steering apparatus is operated for steering purpose to change the pressure differential across the orifice, which is reflected as a restriction of the return flow of the excess amount by the spool valve to result in an increase in the flow rate being supplied which has once been reduced in accordance with the magnitude of the pressure rise, thus destroying the very purpose even though a desired flow control can be achieved, including the drooping response, when the power steering apparatus is not operated or is under a no-load condition.

To accommodate for this difficulty, a flow control valve unit has been proposed in which part of the supply passage is formed with a restriction, with a control spool, which is intended to restrict the flow, responding to a pressure differential across the restriction in order to reduce the throttling action of the orifice, as disclosed in Japanese Laid-Open Patent Application No. 4,469/1982 (Japanese Granted Patent Publication No. 37749/1988). Specifically, the orifice is made to be controllable in a variable manner on the basis of an increase in the pump discharge, which is caused by an increase in the number of revolutions of the pump, independently from the displacement of the spool valve, thus preventing the flow rate from returning to its original value upon operation of the power steering apparatus. With this arrangement, the described difficulty caused by a control of the flow rate through the variable control of the simple orifice can be eliminated by the combination of the restriction and the control spool which variably controls the orifice in accordance with the pressure differential produced across the restriction, thus providing an enhanced usefulness.

However, in a flow control valve unit having a non-return drooping response contructed in a manner mentioned above, a control spool must be added in order to enable a variable control of the orifice. As a consequence, in view of its relationship with a flow controlling spool valve, the number of components must be increased, and the construction must be complicated. In addition, in order to achieve a required flow control response, a high demand is imposed in the accuracy of machining the components and in adjusting the timing of operation. It is also difficult to adjust the flow control response including the drooping response independently from the magnitude of an increase in the load pressure as the power steering apparatus is operated, and accordingly, it is desired that some remedy be provided which eliminates all of these difficulties.

To this end, the present applicant has previously proposed a flow control valve which has simplified the construction and reduced the number of parts required while facilitating an adjustment of the drooping response (see Japanese Laid-Open Patent Application No. 132,471/1989). In this flow control valve, a tubular union is fixedly mounted in a connector, which is disposed in a spool valve receiving bore, and the union is formed with orifices, while a sleeve fitted around the union is disposed for sliding movement in response to a pressure differential across a restriction so that the orifices may be controlled or reduced. This valve achieves the described objective, but it is also desirable to provide a flow control valve unit in which the number of parts is further reduced and which is capable of fully functioning if the accuracy of machining is reduced.

SUMMARY OF THE INVENTION

Accordingly, it is an object of the invention to provide a flow control valve unit having a greatly simplified construction, but capable of providing a flow control response including a non-return drooping response.

The described object is achieved in accordance with the invention by providing an orifice in a supply passage which feeds a hydraulic fluid discharged from a pump to a hydraulic instrument. A pressure differential across the orifice opens a spool valve which is used for controlling the flow rate to return part of the hydraulic fluid. In a flow control valve unit thus constructed, in accordance with the invention, the spool valve is slidably fitted in a bore which is formed in a pump housing, and a connector is fixedly mounted in the opening of the bore with its one end extending into the bore. The connector has an outlet which delivers a hydraulic fluid to the hydraulic instrument, and also an axial bore which is formed in contiguous relationship with the outlet and in which a valve sleeve is slidably fitted and urged to extend into the connector. The orifice is formed in the valve sleeve, which is formed with a flange at its end located adjacent to the spool valve so that a restriction may be defined between the outer periphery of the flange and the inner peripheral surface of the bore, thus restricting the flow rate of a fluid which is introduced into the bore from the pump. When a pressure differential across the restriction exceeds a given value, the valve sleeve is operated for sliding movement. When the valve sleeve is in its inoperative position, the orifice is open while when the valve sleeve slides in response to a pressure differential across the restriction, the orifice can be controlled or reduced.

It is a second object of the invention to provide a flow control valve unit in which an increase in the pressure differential across the restriction, which is more than is required, is suppressed so as to allow a diminishment of the effect of reducing the dissipated horsepower resulting from a decrease in the flow rate, which may be caused by the pressure differential, and is minimized as much as possible.

DESCRIPTION OF EMBODIMENT

Figure 1:
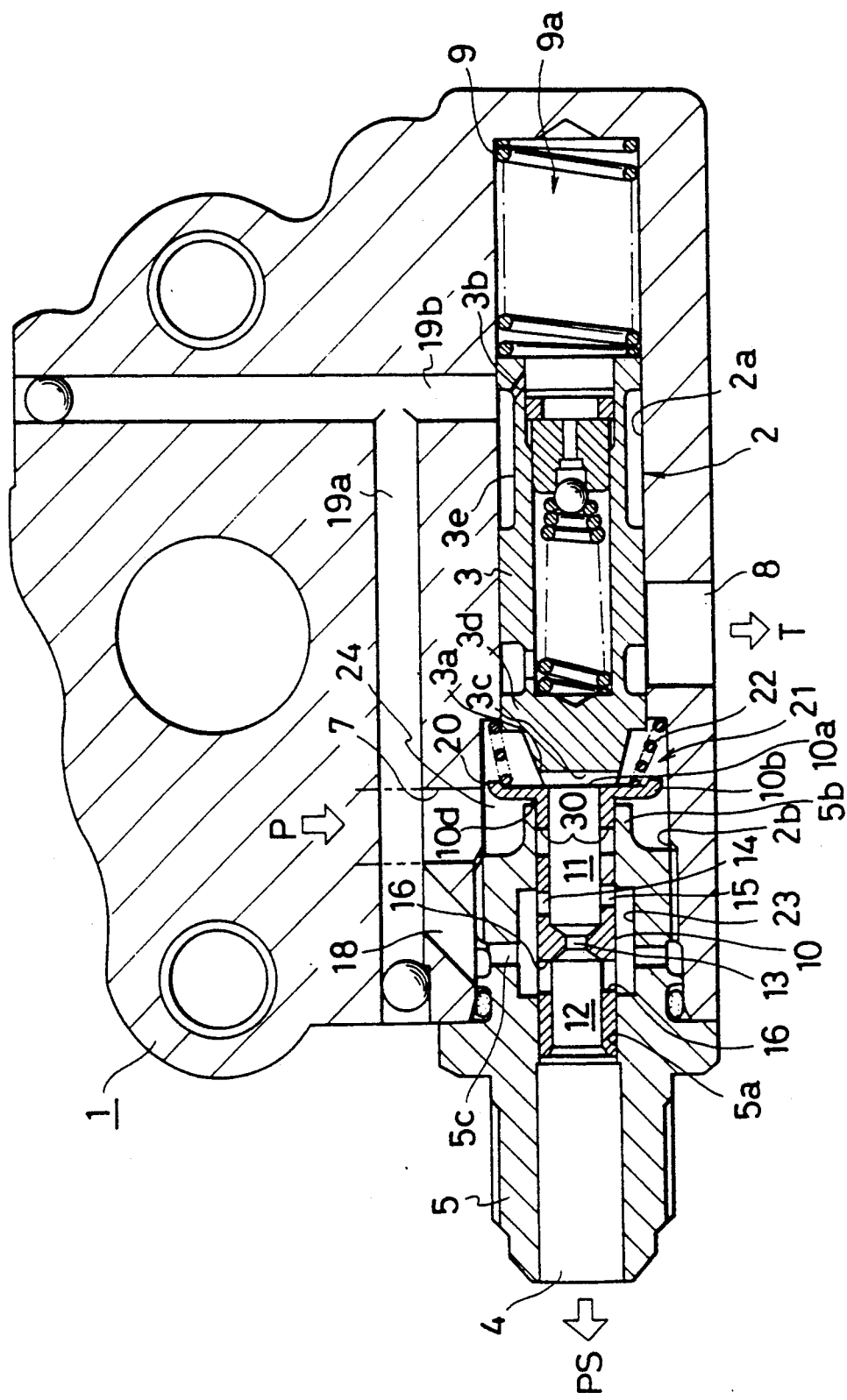
FIG. 1 is a longitudinal section of part of a flow control valve unit according to one embodiment of the invention.

Referring to the drawings, an embodiment of the invention will now be described. FIG. 1 illustrates an embodiment of the invention as applied to a pressure oil supply system associated with a hydraulic power steering apparatus. Referring to this figure for a brief description of the general arrangement, a pump housing 1 is formed with a bore 2 for receiving a spool valve which has an increased diameter toward its opening, it being understood that the entire housing is not shown specifically. The bore 2 also includes a portion 2a of a reduced diameter in which a spool valve 3 internally housing a relief valve is slidably fitted. Threadably engaged and secured in a portion 2b of an increased diameter portion of the bore are a pressurized oil outlet 4 which is connected to a flow path switching valve of a power steering apparatus PS and a connector 5 having an axial bore 5a which continues to the outlet 4. An end 5b of the connector 5 which is inserted into the bore 2 is disposed within the increased diameter portion 2b.

A valve sleeve 10 which is used for restricting a flow rate is fitted in the axial bore 5a of the connector 5 so as to be slidable in the axial direction, and has its one end projecting toward the spool valve 3 beyond the axial bore 5a of the connector 5.

A supply passage 7 connected to the discharge side of an oil pump P opens into the increased diameter portion 2b of the bore 2 while a return passage 8 opens into the reduced diameter portion 2a and is connected to a tank T. The spool valve 3, which is fitted in the reduced diameter portion 2a is urged toward the increased diameter portion 2b by a spring 9 which is disposed in a chamber 9a which is in turn located adjacent to one end of the portion 2a. When inoperative, the spool valve 3 comes to a stop as a result of the abutment of its forward end 3a against an end face of an opening 10a of the valve sleeve 10 which is located toward the spool valve 3, thus interrupting a communication between the supply passage 7 and the return passage 8. The forward end 3a of the spool valve 3 which abuts against the valve sleeve 10 is formed with a diametrically extending slit 3c, thus securing a flow path for the pressurized oil.

The internal surface of the axial bore 5a of the connector 5 in which the valve sleeve 10 is fitted is formed with a wide annular groove 23, thus dividing the internal surface of the axial bore 5a along which the valve sleeve 10 slides into a sliding portion located toward the spool valve 3 and another sliding portion located toward the pressurized oil delivery outlet 4. The internal space within the annular groove 23 is connected to the spring chamber 9a containing the spring 9, which urges the spool valve 3, through a throttle path 5c which is formed to extend through the connector 5 in a radial direction and acting as a damper orifice, paths 18, 19a and 19b formed in the pump housing 1, an annular groove 3e formed around the spool valve 3 and a radial path opening 3b.

The valve sleeve 10 is formed with a partition which divides the interior of the valve sleeve into an upstream pressurized oil passage 11 (located toward the spool valve 3) and a downstream pressurized oil passage 12

(located toward the outlet 4), and a fixed orifice 13 is formed in the partition to extend therethrough, thus communicating both of the pressurized oil passages 11, 12 with each other.

At an end which projects into the bore 2 beyond the connector 5, the valve sleeve 10 is formed with a flange 10b, and a spring 22 is disposed between the front face (or the right-hand face, as viewed in FIG. 1) of the flange 10b and step defined between the portions 2b and 2a of the bore 2, thus urging the valve sleeve 10 in a direction to extend into the connector 5, or to the left, as viewed in FIG. 1. As will be detailed later, a restriction 20 is defined between the outer peripheral surface of the flange 10b and the inner peripheral surface of the portion 2b of an increased diameter of the bore 2 for restricting the flow rate of a fluid which is fed from the pump P to the power steering apparatus PS through the flow control valve unit. When a pressure differential across the upstream and the downstream side of the restriction 20 exceeds a given value, the valve sleeve 10 is driven to the right, as viewed in FIG. 1.

At a location slightly rearward (or to the left, as viewed in FIG. 1) of the flange 10b, the valve sleeve 10 is formed with a stop 10d having a diameter which is slightly greater than the diameter of its portion which slides relative to the connector 5 so that the valve sleeve 10 which is urged by the spring 22 comes to a stop when the stop 10d bears against the front end face of the inner end 5b of the connector 5.

At a location upstream of the fixed orifice 13, the valve sleeve 10 is formed with a pair of metering orifices 14, 15 which extend through the valve sleeve 10 at axially offset locations. When the valve sleeve 10 is stationary at its inoperative position as urged by the spring 22, the both orifices 14, 15 are open to the annular groove 23 formed in the internal surface of the connector 5, as shown in FIG. 1, whereby as the valve sleeve 10 is driven to the right (see FIGS. 2, 3 and 4), these orifices are gradually throttled by the inner surface of the axial bore 5a of the connector 5 and subsequently blocked successively. In this manner, the both orifices 14, 15 function as variable orifices by virtue of its relationship with respect to the edge of the annular groove 23 formed in the connector 5.

At a location downstream of the fixed orifice 13, the valve sleeve 10 is formed with a plurality of communication openings 16 which extend through the valve sleeve 10. These communication openings 16 are located so that they cannot be closed as the valve sleeve 10 slides to the right, as viewed in FIG. 1, from its inoperative position and the variable orifices 14, 15 are throttled, thus maintaining a communication between the oil pressure passage 12 downstream of the valve sleeve 10 and the annular groove 23 formed in the connector 5.

A pressure which prevails upstream of the fixed orifice 13 and both of the variable orifices 14, 15 act upon the end face of the spool valve 3 which is located toward the valve sleeve 10 while a pressure which prevails downstream of the orifices 13, 14 and 15 acts upon the end face of the spool valve 3 located toward the spring 9 through the above mentioned paths and openings 5c, 18, 19a, 19b, 3e and 3b, whereby when the pressure differential across both end faces exceeds the resilience of the spring 9, the spool valve 3 moves to the right, as viewed in FIG. 1, while flexing the spring 9.

Toward the flange 10b, the valve sleeve 10 is formed with a bypass opening 30 extending therethrough, which is blocked by the internal surface of the axial bore 5a of the connector 5 in the inoperative position of the valve sleeve 10, but which is opened whenever the valve sleeve 10 has moved to the right beyond a given stroke.

The space within the portion 2b of an increased diameter of the bore 2 and located between the connector 5 and the spool valve 3 is divided by the flange 10b into a pair of chambers 24, 21 (one being located nearer the supply source and the other located nearer the forward end 3a of the spool valve 3). A clearance 20 is defined between the outer peripheral surface of the flange 10b of the valve sleeve 10 and the internal peripheral surface of the portion 2b of an increased diameter of the bore 2, and defines the restriction 20 which restricts the flow rate passing between the chambers 24 and 21.

Accordingly, as the pressurized oil is discharged from the oil pump P and is introduced into the chamber 24 in the portion 2b of an increased diameter of the bore 2 which is located to communicate with the supply passage 7, there occurs a pressure drop as the pressurized oil passes through the restriction 20 into the chamber 21 located nearer the forward end 3a of the spool valve 3. When the pressure differential across the restriction 20 exceeds the resilience of the spring 22, the valve sleeve 10 is moved to the right, as viewed in FIG. 1.

It is to be noted that the magnitude of the flow rate which causes the pressure differential across the restriction 20 to be produced which is sufficient to operate the valve sleeve 10 is chosen to be greater than the maginitude of the flow rate acting upon the opposite ends of the spool valve 3 in order to produce a pressure differential across the orifice to operate the spool valve 3. Accordingly, as the flow rate of the pressurized oil is increased gradually, the spool valve 3 is operated initially, and subsequently the valve sleeve 10 is operated.

The flow path of the pressurized oil in the flow control valve unit mentioned above will now be described. As the pressurized oil is discharged from the oil pump P and is then introduced into the chamber 24 formed in the bore 2 and communicating with the supply passage 7, it moves past the restriction 20 to enter the chamber 21 located adjacent to the forward end 3a of the spool valve 3, whereby it passes through the slit 3c formed in the forward end 3a to flow into the upstream pressurized oil passage 11 through the opening 10a of the valve sleeve 10. Part of this pressurized oil passes through the fixed orifice 13 to enter the downstream pressure oil passage 12 while the remainder finds its way through the both variable orifices 14, 15 into the annular groove 23 formed in the connector 5, whereupon it passes through the communication opening 16 into the downstream pressurized oil passage 12 to be merged with the pressurized oil which has passed through the fixed orifice 13. Subsequently, the pressurized oil is delivered to the power steering apparatus PS through the outlet 4 of the connector 5. It is also to be noted that the pressurized oil in the annular groove 23 formed in the connector 5, or the pressurized oil downstream of the orifices 13, 14, 15 is also introduced into the spring chamber 9a through the throttle path 5c in the connector 5, paths 18, 19a, 19b formed in the pump housing 1, the annular groove 3e and the radial path opening 3b formed in the spool valve 3. When the pressure differentials across the orifices 13, 14, 15 which act upon the opposite ends of the spool valve 3 causes it to move to the right, as viewed in FIG. 1, to thereby open the return passage 8, an excess amount of the flow rate which is supplied to the power steering apparatus PS is returned to the tank T.

Referring to FIGS. 1 to 6, the operation of the flow control valve unit mentioned above will now be described. When the number of revolutions of the oil pump P which is driven by the onboard engine is low or when the automobile is running at a low speed, pressure differentials developed across the fixed orifice 13 and the variable orifices 14, 15 are insufficient to operate the spool valve 3, which therefore remains in abutment against the front end face of the valve sleeve 10 under the resilience of the spring 9, thus interrupting a communication between the supply passage 7 and the return passage 8. No pressure differential is developed across the restriction 20 which is sufficient to operate the valve sleeve 10, which therefore is urged by the spring 22 to remain stationary with the stop 10d abutting against the front end face of the connector 5 (the condition shown in FIG. 1). Accordingly, the pressurized oil which is discharged from the oil pump P will be supplied in its entirety to the power steering apparatus PS (range A shown in FIG. 6).

Figure 2:
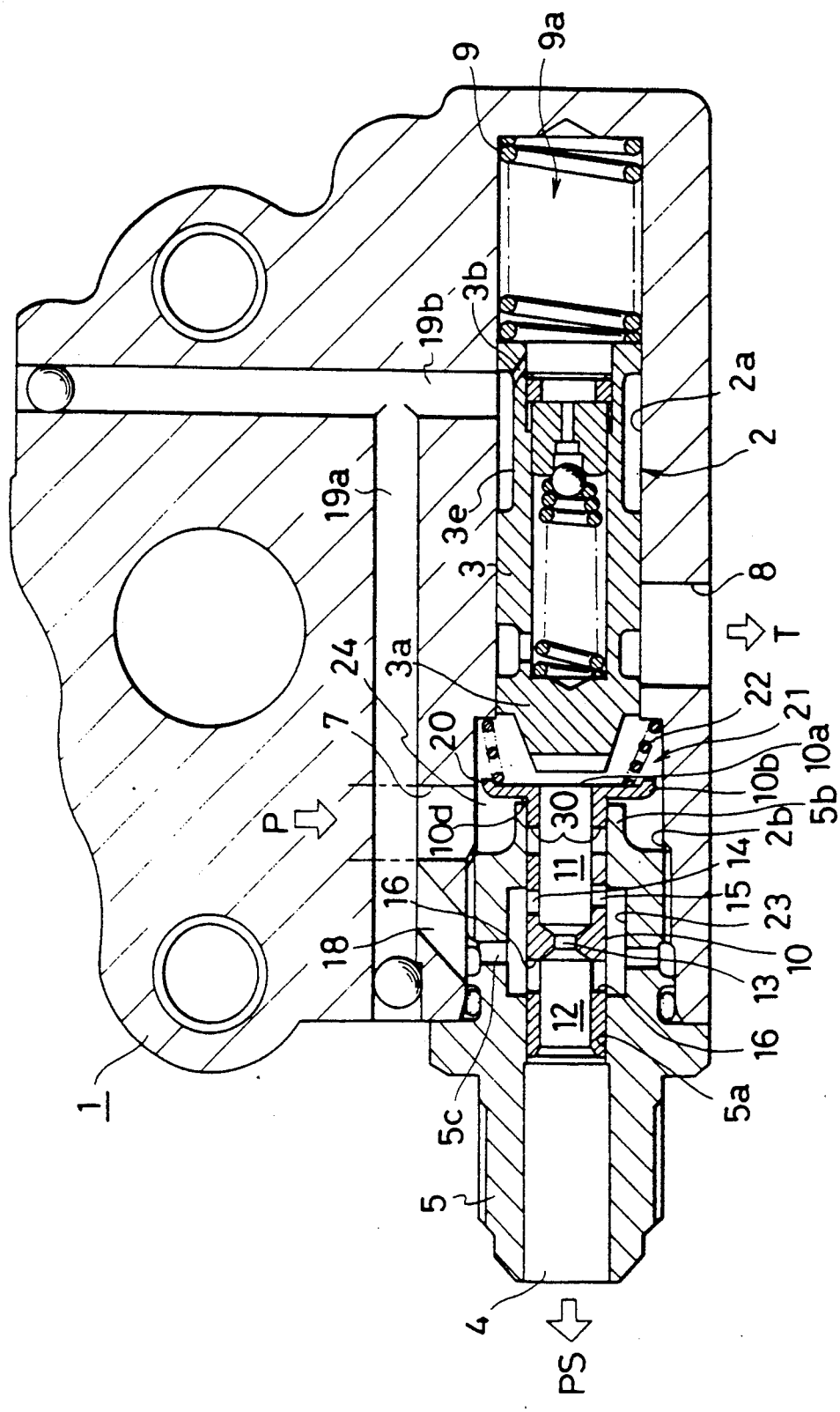
FIG. 2 is a schematic section, illustrating the operation of the flow control valve unit shown in FIG. 1.

As the running speed of the vehicle increases, and the number of revolutions of the pump gradually increases, the discharge flow from the oil pump P increases, whereby the pressure differentials across the fixed orifice 13 and the variable orifices 14, 15 also increase, and when the pressure differentials exceed the resilience of the spring 9, the spool valve 3 begins to be driven to the right (the condition shown in FIG. 2). When the movement of the spool valve 3 establishes a communication between the return passage 8 and the supply passage 7, an excess amount of flow is returned to the tank T through the return passage 8, thereby maintaining the flow rate $Q_1$ supplied to the power steering apparatus PS constant (range B shown in FIG. 6).

As the number of revolutions of the pump P further increases and the vehicle is running at a medium speed, the flow rate which passes through the restriction 20 increases to increase the pressure differential thereacross, which, upon overcoming the resilience of the spring 22, drive the valve sleeve 10 to the right. As a consequence, the orifices 14, 15 formed in the valve sleeve 10, which have been located in a region within the annular groove 23 of the connector 5, now move over the sliding portion of the axial bore 5a which is located toward the spool valve 3 to be throttled in a gradual manner (see FIG. 3). Thereupon, the flow rate fed to the power steering apparatus PS through the variable orifices 14, 15 decreases gradually while the pressure differentials developed across these variable orifices 14, 15 increase to cause a further movement of the spool valve to the right, thus increasing the amount returned to the tank T (range C shown in FIG. 6). By reducing the flow rate supplied to the power steering apparatus PS in this manner, the running stability of the vehicle when running at a medium and a high speed is enhanced, allowing the dissipated horsepower to be diminished.

When the number of revolutions of the pump P increases furthermore and the vehicle is running at a high speed, the increased discharge flow from the oil pump P increases the pressure differential across the restriction 20, thus causing a further movement of the valve sleeve 10 to the right. Such movement of the valve sleeve 10 further increases a throttling action of the variable throttles 14, 15, which are sequentially blocked. Subsequently, a constant flow rate $Q_2$ which has passed through the fixed orifice 13 alone is fed to the power steering apparatus PS (range D shown in FIG. 6). In the unit of the present embodiment, all that is required is to provide the valve sleeve 10 having the drooping function slidably fitted in the axial bore 5a of the connector 5. Accordingly, the number of parts required is reduced, and no particular accuracy of machining these parts is required. In addition, the manner of operation of various parts can be established as desired, providing an advantage that a flow control function having a desired response may be realized.

Under the condition that the valve sleeve 10 has moved to the right, any pressure fluctuation occurring on the part of the power steering apparatus PS causes no change in the flow rate which passes through the restriction 20, and hence the pressure differential thereacross remains unchanged and accordingly there results no movement of the valve sleeve 10. Accordingly, the flow rate supplied to the power steering apparatus PS remains unchanged, preventing a drooped flow rate from returning to its original value.

Figure 3:
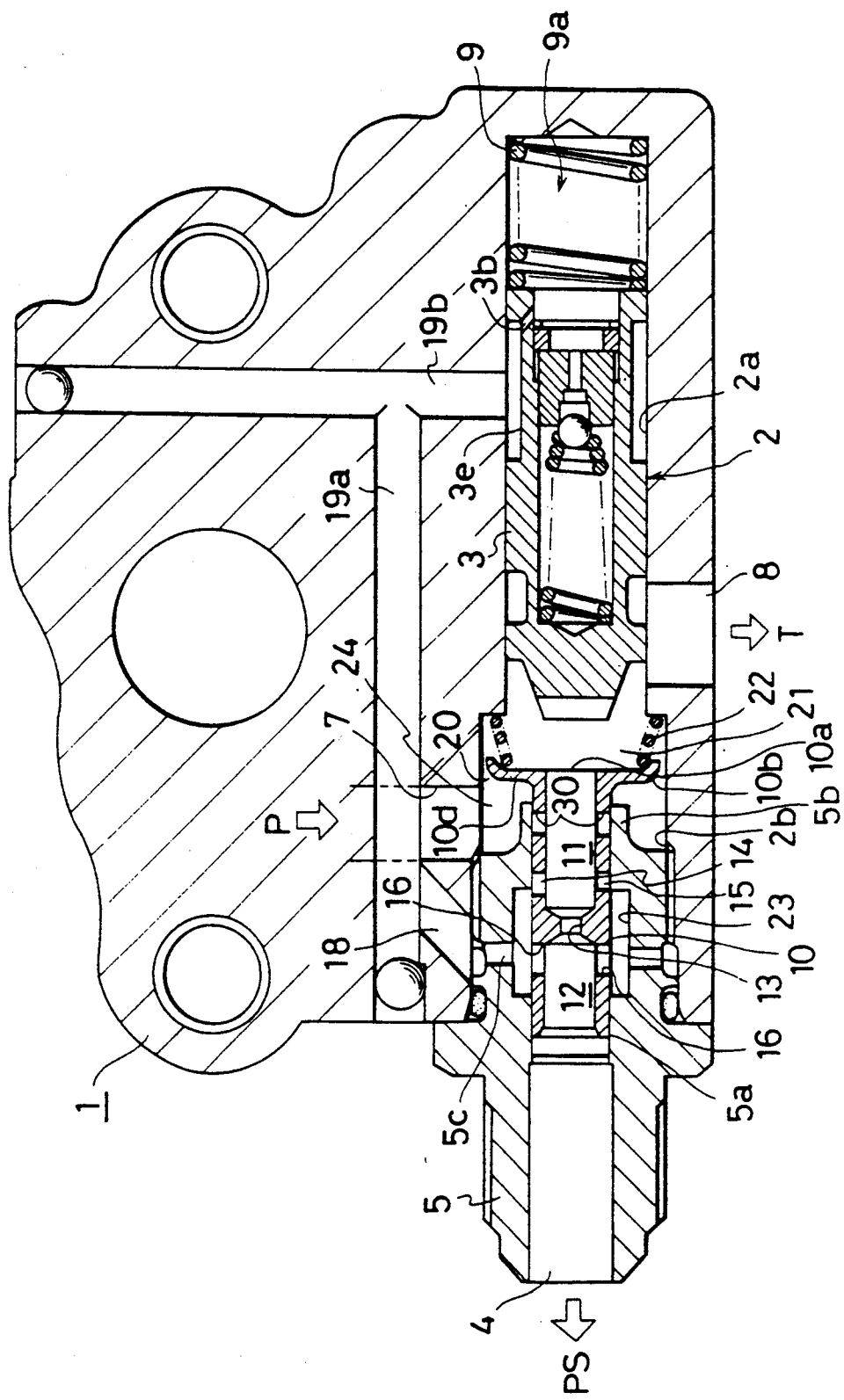
FIG. 3 is a schematic section, illustrating another phase of operation of the flow control valve unit shown in FIG. 1.
Figure 4:
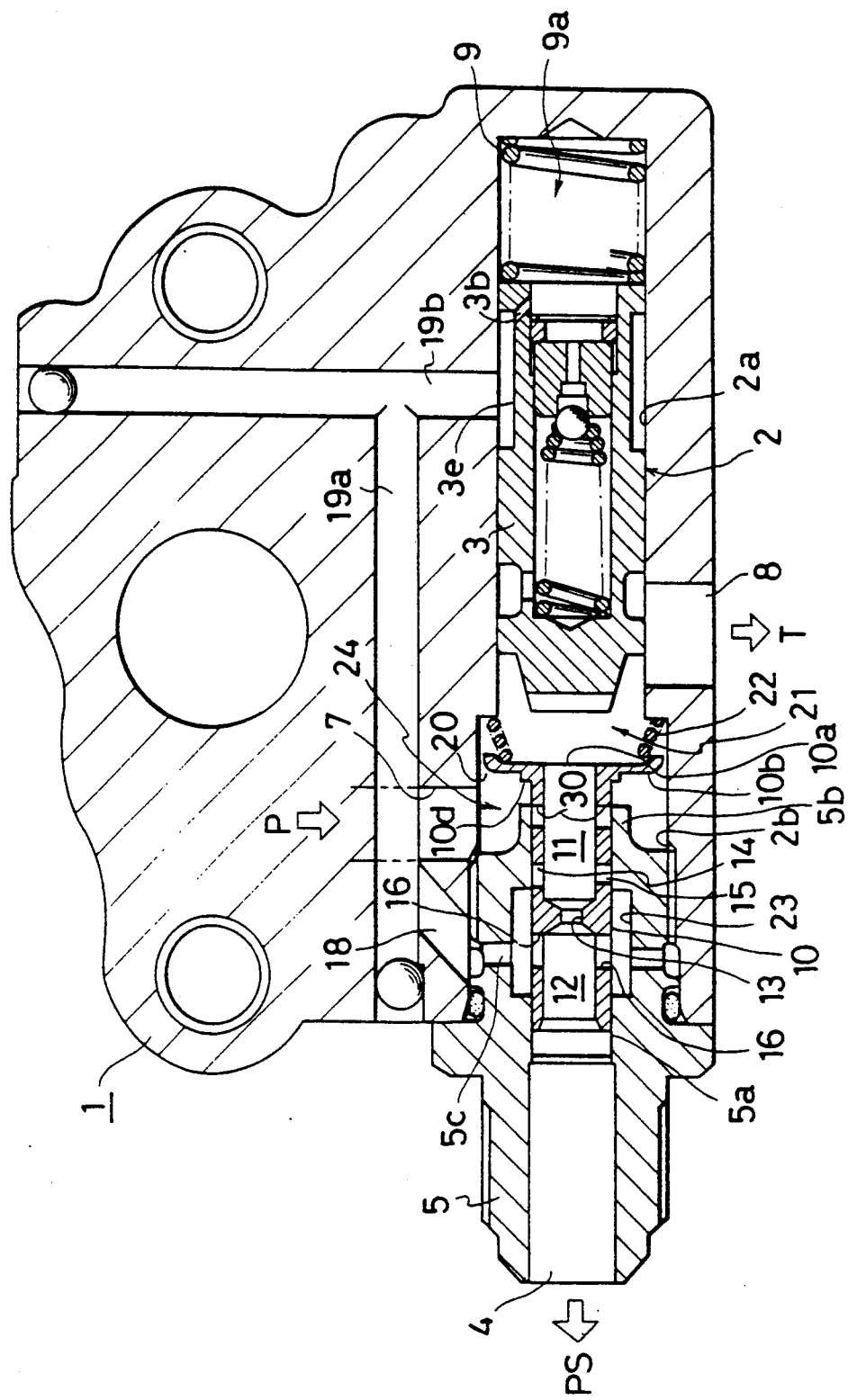
FIG. 4 is a schematic section, illustrating a further phase of operation of the flow control valve unit shown in FIG. 1.
Figure 5:
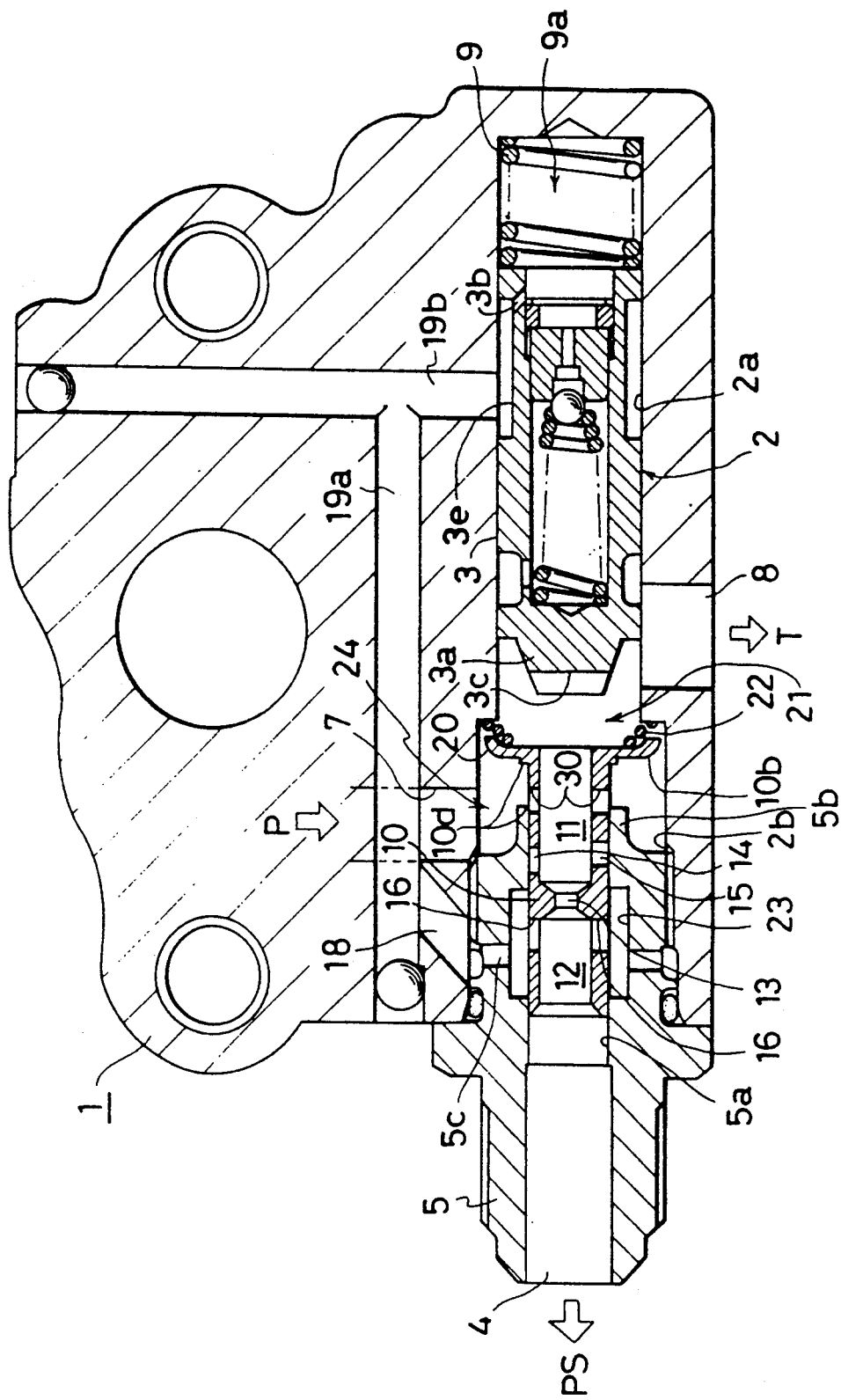
FIG. 5 is a schematic section, illustrating a further phase of operation of the flow control valve unit shown in FIG. 1.
Figure 6:
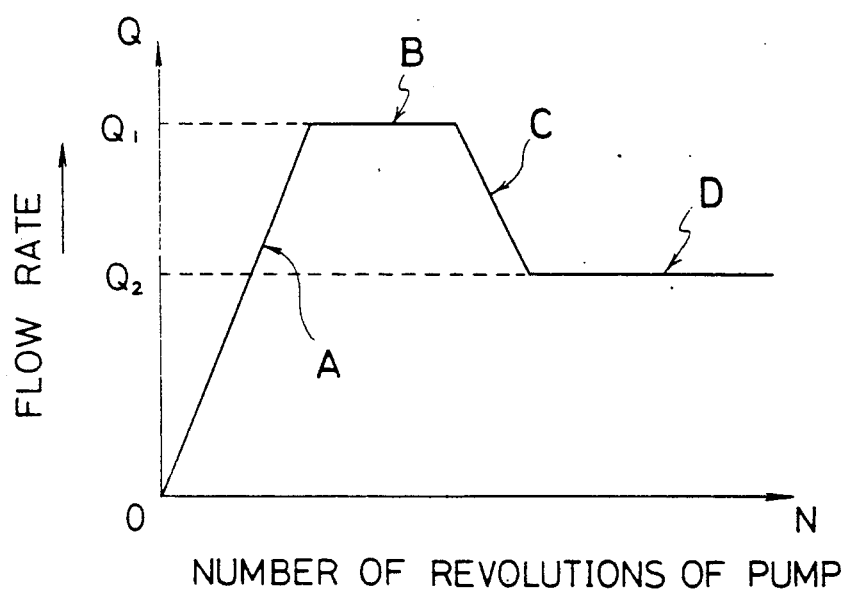
FIG. 6 graphically illustrates the flow control response achieved by the flow control valve unit of the invention.

If the discharge from the pump P further increases and the pressure differential across the restriction 20 further increases under the condition that the variable orifices 14, 15 are completely closed and only the flow passing through the fixed orifice 13 is being fed to the power steering apparatus PS, the valve sleeve 10 is further displaced from the condition shown in FIG. 3, and the bypass opening 30 formed toward the flange 10b will be opened (see FIGS. 4 and 5). Thereupon, a direct communication will be established between the upstream side of the restriction 20 or the chamber 24 communicating with the supply source and the downstream side thereof or the chamber 21 located toward the spool valve 3, suppressing a further increase in the pressure differential across the restriction 20. In a conventional flow control valve unit having a non-return drooping response, in consideration of the need to secure the running stability by increasing the steering force when the vehicle is running at a high speed, the flow rate which passes through the restriction will be very high, and consequently the internal pressure within the supply passage 7 will be higher than is required during the high speed running, with the consequence that the pump driving horsepower must be increased when running at a high speed. However, with the apparatus of the present embodiment, it will be appreciated that the provision of the bypass opening 30 in the part of the valve sleeve 10 which includes the variable orifices 14, 15 allows a non-return drooping response to be achieved with a simple arrangement while suppressing the internal pressure within the supply passage 7 from more than is required when running at a high speed, thus preventing an increase in the pressure loss and achieving a power saving effect.

It should be understood that the invention is not to be limited to the precise construction shown in the apparatus of the embodiment described above, but that the configuration and the construction of various parts may be modified, changed or substituted in a suitable manner. By way of example, the configuration of the opening 10a or flange 10b of the valve sleeve 10 as well as the position, the configuration and the number of the orifices 13, 14, 15, the path openings 16, 30 and the restriction 20 may be suitably chosen as desired.

What is claimed is:

1. A flow control valve unit including an orifice formed in a supply passage which supplies hydraulic fluid discharged from a pump to a hydraulic instrument and in which a pressure differential across the orifice is effective to open a normally closed flow controlling spool valve to return part of the hydraulic fluid to a return passage, comprising:

a pump housing having a spool valve receiving bore therein and to which is connected said supply passage and said return passage;

a connector secured within a spool valve receiving bore and having an axial bore therethrough and an outlet for delivering a hydraulic fluid to the hydraulic instrument, said axial bore having an annular groove therein;

a valve sleeve slidably fitted in said axial bore, said valve sleeve having an axial passage therethrough and means defining an orifice in said axial passage which divides the axial passage into an upstream side and a downstream side;

means for continually yieldably urging said valve sleeve into said axial bore away from said spool valve;

a variable orifice oriented on said valve sleeve upstream of the fixed orifice, a communication path extending through said valve sleeve downstream of the fixed orifice and connected in fluid circuit with said hydraulic instrument, said variable orifice and said communication path normally communicating with each other through said annular groove;

a flange formed on an end of the valve sleeve which is adjacent the spool valve, and a restriction defined between an outer periphery of the flange and an inner peripheral surface of the valve receiving bore for restricting the flow rate of a fluid which is introduced into the valve receiving bore from the pump to cause a sliding movement of the valve sleeve from a first position toward a second position whenever a pressure differential thereacross is at or exceeds a given value and against a yieldable force provided by said means for continually yieldably urging said valve sleeve into said axial bore, the valve sleeve in the first position thereof and the normally closed flow controlling spool valve effectively blocking fluid flow to said return passage, an increased pressure on the hydraulic fluid from the pump causing the flow controlling spool valve to open to facilitate a return of part of the hydraulic fluid to the return passage and to cause an increased pressure differential across the restriction to thereby cause an increased pressure drop across the orifice to limit the flow of hydraulic fluid to the hydraulic instrument.

2. The flow control valve unit according to claim 1, wherein the variable orifice opens to the annular groove when the valve sleeve is in the first position, and wherein the increased pressure differential across the restriction causes a shifting of the valve sleeve toward the second position to gradually throttle said variable orifice.

3. The flow control valve unit according to claim 1, wherein the communication path is maintained open to the annular groove even during movement of the valve sleeve between the first and second positions thereof.

4. The flow control valve unit according to claim 1, wherein said valve sleeve includes a bypass opening which is disposed within the axial bore of the connector and is blocked when said valve sleeve is in said first position, said bypass opening providing fluid communication between an upstream and a downstream side of the restriction in response to a movement of said valve sleeve to a position substantially adjacent said second position caused by an increased pressure differential across the restriction.

* * * * *